United States Patent [19]

Koehler

[11] Patent Number: 4,566,802
[45] Date of Patent: Jan. 28, 1986

[54] ELECTRONIC CYCLE TIMER FOR A HOUSEHOLD APPLIANCE

[75] Inventor: Gerald C. Koehler, Peru, Ill.

[73] Assignee: Worldtronics International, Inc., Oglesby, Ill.

[21] Appl. No.: 641,789

[22] Filed: Aug. 16, 1984

[51] Int. Cl.⁴ ............................................... A23F 0/00
[52] U.S. Cl. ........................................ 368/9; 99/281; 99/283; 219/441; 219/492
[58] Field of Search ................. 99/280, 281, 337, 338; 219/492, 441; 368/9, 10

[56] References Cited

U.S. PATENT DOCUMENTS

| | | | |
|---|---|---|---|
| 4,330,702 | 5/1982 | Cheng | 99/281 |
| 4,406,217 | 9/1983 | Oota | 99/280 |
| 4,468,406 | 8/1984 | d'Alayer O'Costemore d'Arc | 99/280 |

FOREIGN PATENT DOCUMENTS 2101471 1/1983 United Kingdom ................. 99/280

*Primary Examiner*—Bernard Roskoski
*Attorney, Agent, or Firm*—Leydig, Voit & Mayer, Ltd.

[57] ABSTRACT

An electrical timer for a household appliance typically has an integrated circuit including an internal presettable clock registering the time of day, an internal register storing a presettable activation time, and a gate generating an activation signal when an activation enable signal is present and the clock registers the activation time. To prevent an activation signal from being generated on a daily basis without manual intervention, a bistable circuit is provided to generate the activation enable signal in response to a cycle enable signal received from the appliance operator. The bistable circuit is set to activate the activation enable signal upon receipt of the cycle enable signal, and is reset by the activation enable signal to disable the activation enable signal. For a coffee maker, the bistable circuit is preferably reset by the activation signal at the active-to-inactive transition signalling the end of brewing. To reject electrical noise pulses, the bistable circuit preferably has a response time of at least approximately five milliseconds. Preferably the cycle enable signal is generated by a three position switch having "on" and "off" positions which activate and deactivate the activation signal regardless of the time of day, and a middle "automatic" position. In this case the bistable circuit is set when the switch is moved from the automatic position to the off position. Alternatively a separate push-button switch generates the cycle enable signal.

20 Claims, 1 Drawing Figure

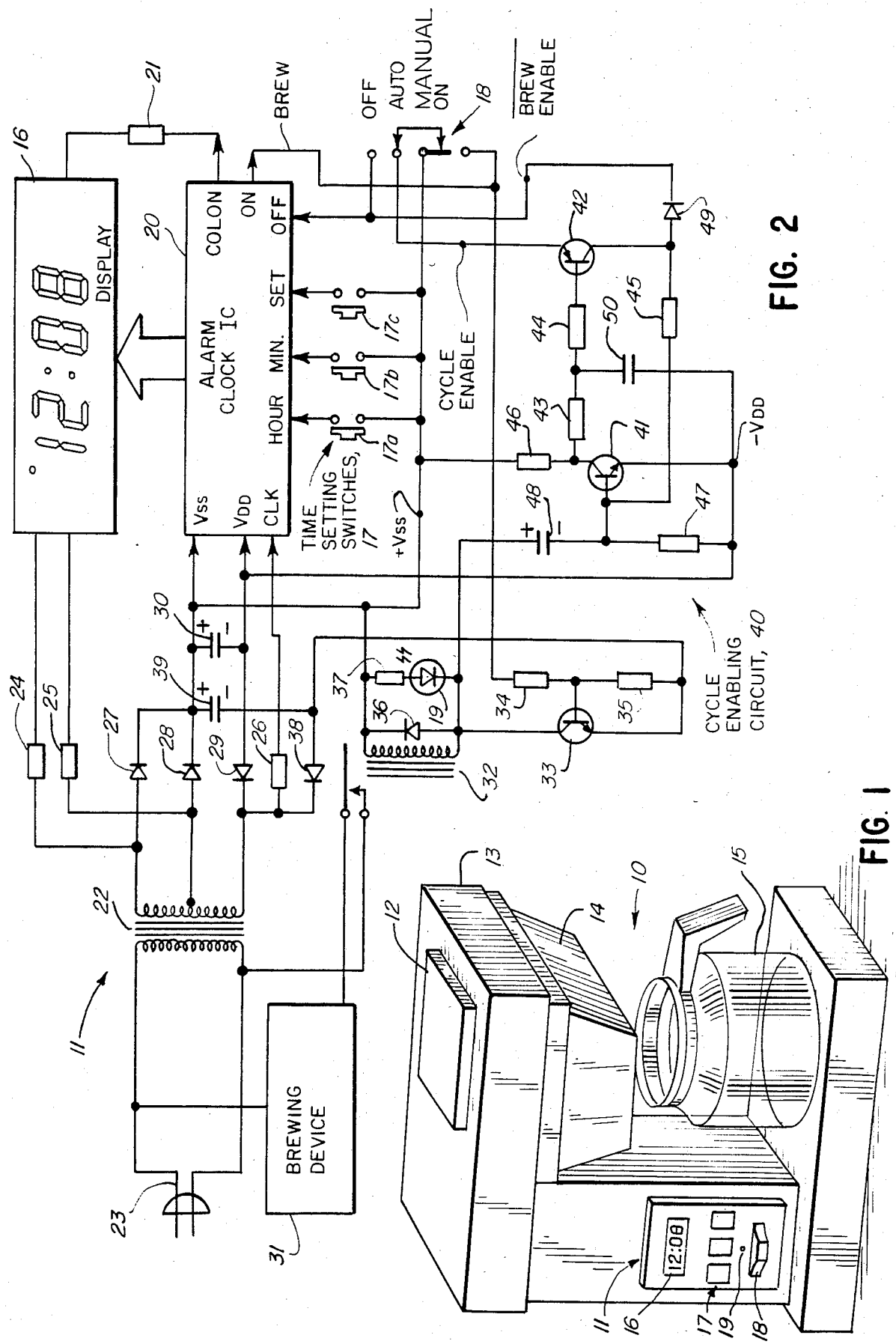

ELECTRONIC CYCLE TIMER FOR A HOUSEHOLD APPLIANCE

BACKGROUND OF THE INVENTION

The present invention relates generally to electronic timers, and specifically to an electronic timer which activates a household appliance at a preset time of day.

For automatic activation of household appliances such as coffee makers, electronic cycle timers have been used which generate an activation signal at a preset time each day. Such an electronic timer basically consists of an integrated circuit which is manufactured in high volume and is used in digital alarm clocks. The integrated circuit includes an internal presettable clock registering the time of day, an internal register storing a presettable activation time, and a gate generating an activation signal when an activation enable signal is present and the clock registers the activation time. A timer for a coffee maker also typically includes a three position switch having an "off" position, an "automatic" position, and an "on" position which enables the coffee maker regardless of the time of day.

Underwriters Laboratories has expressed concern with the operation of coffee makers in the automatic mode. About seventy fires per year have been attributed to unattended coffee makers. Presumably a fire is very unlikely for one cycle after the coffee maker has its water reservoir filled. Repeated operation with an empty water reservoir, however, increases the likelihood of having a fire. Therefore, Underwriters Laboratories is considering a requirement that an automatic timer must not repeatedly activate a coffee maker when the coffee maker is unattended.

SUMMARY OF THE INVENTION

The primary object of the invention is to provide an economical cycle timer accepting a manual cycle enable signal for the control of a household appliance.

Another object of the invention is to provide a cycle timer accepting a manual cycle enable signal and which uses a conventional alarm clock integrated circuit.

Still another object of the invention is to provide an economical cycle timer which obtains a cycle enable signal from a three position switch including an "off", "automatic", and "on " position.

BRIEF DESCRIPTION OF THE DRAWINGS

Other objects and advantages of the present invention will become apparent upon reading the following detailed description and upon reference to the drawings in which:

FIG. 1 is a perspective view of a coffee maker including the electronic timer of the present invention; and FIG. 2 is a schematic circuit diagram of a preferred embodiment of the invention.

While the invention is susceptable to various modifications and alternative forms, a specific embodiment thereof has been shown by way of example in the drawings and will herein be described in detail. It should be understood, however, that the intention is not to limit the invention to the particular form disclosed, but, on the contrary, the intention is to cover all modifications, equivalents, and alternatives falling within the spirit and scope of the invention as defined by the appended claims.

DESCRIPTION OF THE PREFERRED EMBODIMENT

Turning now to the drawings, there is shown in FIG. 1 a coffee maker generally designated 10 including an electronic cycle timer generally designated 11 according to the present invention. For the brewing of coffee, a cover 12 in the top portion 13 of the coffee maker 10 is opened to gain access to a water reservoir (not shown). After filling the reservoir with a certain amount of water, the cover 12 is replaced. Ground coffee and a coffee filter (not shown) are placed in a tray 14 which is inserted below the top portion 13. An internal heater or brewing device (not shown) is then activated to heat the water in the reservoir and to drip the hot water through the coffee in the tray 14. By the force of gravity, the brewed coffee drips from a center hole (not shown) in the tray 14, and is received in a flask 15.

In contrast to the old fashioned percolator-type coffee maker, the drip-type coffee maker 10 does not boil the brewed coffee. Consequently, the brewed coffee retains many of the subtle flavors which are otherwise lost or destroyed by excessive heat which is applied in a percolator. The drip-type coffee maker 10 has recently enjoyed considerable commercial success as a household appliance as a result of consumers becoming aware of these advantages.

The drip-type coffee maker 10, however, has the disadvantage that the brewing process is slower than that required for an old fashioned percolator. During the morning rush, household consumers usually do not have time to wait while the coffee is brewing in the drip-type coffee maker. So that a consumer may arise each morning to find a fresh, hot supply of brewed coffee awaiting, the electronic timer 11 is set to start the brewing process before the consumer arises. Of course, the consumer has the responsibility of previously loading the coffee maker 10 with water and ground coffee before retiring in the evening.

To enable the consumer to set the timer 11, the timer has a digital display for indicating the time of day and the activation time, and push buttons 17 for setting the correct time of day and the desired activation time. The timer also has an indicator light 19 for signaling that the coffee maker 10 is activated for brewing, and a slide switch with "off", "automatic", and "on" positions.

It is thought to be unsafe to operate the coffee maker 10 without first filling the unit with at least a certain amount of water. The water ensures that the temperature of the heating element or brewing device (not shown) in the coffee maker 10 will not exceed the boiling point of water. If temperatures in the coffee maker 10 exceed the boiling point of water, there is a very small but finite chance that a fire may occur.

According to a basic aspect of the present invention, the electronic timer 11 ensures that an unattended coffee maker 10 is not repeatedly activated. After filling the coffee maker with water and ground coffee, the user must supply a cycle enable signal, for example, by toggling the slide switch 18. Otherwise, the timer 11 will not activate the coffee maker for brewing.

Turning now to FIG. 2, there is shown a schematic circuit diagram of the electronic timer 11. The basic timing functions are performed by a standard alarm clock integrated circuit 20 which drives the display 16. Preferably the alarm clock integrated circuit is a type TMS 3450 manufactured by Texas Instruments, Inc.

and the display is a four digit seven segment duplex LED common cathode display such as part number SL-1008023T. The colon of the display 16 is separately driven by the alarm clock integrated circuit 20 through a 150 ohm resistor 21.

The alarm clock integrated circuit 20 requires a 12 volt power supply to its $V_{SS}$ and $-V_{DD}$ inputs. The power is provided by a transformer 22 excited by household current from an electrical cord 23. The transformer 22 is center tapped to provide oppositely phased multiplexing signals to the display 16 through respective 10 ohm resistors 24 and 25, and a clocking signal to the integrated circuit 20 through a 510 K ohm resistor 26. The alternating voltage from the secondary of the transformer 22 is rectified by directional diodes 27, 28, 29 (part no. 1N4001) and filtered by a 1000 microfarad, 16 VDC capacitor 30 to provide 12 volts to the $V_{SS}$ and $V_{DD}$ inputs to the integrated circuit 20. The integrated circuit 20 has separate hour, minute and set inputs which are selectively connected to $+V_{SS}$ through the time setting switches 17.

The alarm clock integrated circuit 20 has an internal clock registering the time of day which is set so that the display 16 indicates the current hour and minute by depressing the respective hour and minute time setting switches 17a, 17b. The integrated circuit 20 also has an internal register storing an activation time presettable to a desired time by continually closing the set switch 17c and then selectively closing the hour and minute switches 17a, 17b. Moreover, the integrated circuit 20 has a gate generating an activation or BREW signal upon the coincidence of the time of day registered by the internal clock, the preset activation time, and an activation enable signal which is received on an OFF input. The activation signal for the particular alarm clock integrated circuit 20 is active low and is thus designated BREW ENABLE. The three position switch 18, when set to the OFF position, applies $+V_{SS}$ to the OFF input of the integrated circuit 20 so that the BREW ENABLE signal becomes inactive, thereby dissabling the BREW signal. The ON position of the switch 18 applies $+V_{SS}$ to the ON output of the alarm clock integrated circuit 20 to thereby override and activate the BREW signal regardless of whether the gate in the alarm clock integrated circuit 20 activates the BREW signal.

The BREW signal is used to activate the heating element or brewing device 31 in the coffee maker 10. Since the brewing device 31 is operated by household current from the line cord 23, a relay 32 is provided to turn the brewing device 31 on and off in response to the BREW signal. An NPN bipolar transistor 33 is used to excite the coil of the relay 32 in response to the relatively low level BREW signal. The relay driver transistor 33 is preferably a type 1402C transistor and has a 6.8 K ohm series resistor 34 and a 4.7 K ohm shunt resistor 35 connected to its base. The coil of the relay 32 has a damper diode 36 part number 1N4148. The indicator 19 is a light emitting diode (LED) exciting through a 1.5 K ohm current limiting resistor 37. The LED 19 and resistor 37 are connected across the coil of the relay 32 to signal activation of the brewing device 31. The relay 32 is a 9 volt relay and is powered through a separate rectifier circuit including a directional diode 38, part number 1N4001, and a 470 microfarad electrolitic capacitor 39. Since separate respective diodes and filter capacitors are used to provide power to the alarm clock integrated circuit 20 and the relay 32, the operation of the relay 32 does not result in any significant fluctuation in the voltage supplied to the alarm clock integrated circuit.

As described above, the alarm clock integrated circuit 20 activates the brewing device 31 when the switch 18 is in the automatic position and whenever the time registered by the internal clock of the integrated circuit 20 coincides with the activation time stored in the integrated circuit. In accordance with an important aspect of the present invention, to prevent an activation signal from being generated on a daily basis without manual intervention, a cycle enabling circuit generally designated 40 generates the activation enable signal BREW ENABLE in response to a cycle enable signal received from the user. The cycle enabling circuit 32 includes a bistable circuit determining the logic state of the activation enable signal BREW ENABLE. The bistable circuit is set upon the occurrence of the cycle enable signal being received from the user, to activate the activation enable signal BREW ENABLE. The bistable circuit is reset when the integrated circuit 20 generates an active activation signal BREW. In other words, each time that the brewing device 21 is activated, the user must thereafter intervene by generating a cycle enable signal to permit the integrated circuit 20 to reactivate the brewing device 31 at a later time.

As shown in FIG. 2, the bistable circuit comprises a pair of complementary bipolar transistors including an NPN transistor 41, part number 2SC945, and a PNP transistor 42, part number 2SA733, which are interconnected in a regenerative fashion. In a first state, both transistors 41 and 42 are conductive or active, and in a second state both transistors are non-conductive or inactive. The three position switch 18 functions as a means for receiving from the user a cycle enable signal since toggling of the switch 18 from the automatic position to the off position breaks the connection from $+V_{SS}$ to the emitter of PNP transistor 42, thereby rendering the transistor 42 non-conductive. Hence, toggling of the switch 18 will set the transistors 41 and 42 to their inactive or non-conductive states. Alternatively, a separate switch could be provided to receive from the user a cycle enable signal independent of the slide switch 18. A normally closed push-button switch, for example, could connect the emitter of the PNP transistor 42 to $+V_{SS}$ so that manual activation of the push-button switch sets the transistors 41 and 42 to their non-conductive states.

It should be noted that the transistors 41 and 42 are interconnected via resistors 43, 44 and 45. The collector of the NPN transistor 41 is connected to the base of the PNP transistor 42 through the resistors 43 and 44, which are each 20 K ohms. The collector of the PNP transistor 42 is connected to the base of the NPN transistor 41 through the resistor 45 which is 4.7 K ohms. The NPN transistor 14 also has a 20 K ohm load resistor 46 connecting its collector to $+V_{SS}$ and a 4.7 K ohm resistor 47 connecting its base to $-V_{DD}$. These resistors 43–47 in cooperation with the transistors 41, 42 ensure that the transistors 41 and 42 are either both in their conductive or active states or are both in their non-conductive or inactive states. As noted above, this bistable circuit is set to its second or inactive state when the user toggles the switch 18. So that the bistable circuit is reset to its first or active state by the BREW signal, an electrolytic capacitor 48 typically 1 microfarad connects the base of the NPN transistor 41 to the collector of the relay driver transistor 33. In particular, the bistable circuit is set to its first or conductive state at the very end of brewing when the BREW signal changes from an active to an inactive state. In other words, when the BREW signal goes low thereby turning off the relay driver transistor 33, the collector of the relay driver transistor 33 goes high so that a pulse is coupled through the capacitor 48 to turn on the NPN transistor 41 which in turn activates the PNP transistor 42.

It is a noteworthy safety feature that the bistable circuit is reset by the BREW signal at the very end of brewing. The toggling of the switch 18 by the user is intended to indicate that water has been added to the coffee maker in anticipation of another brewing cycle. This, of course, is done after any previous brewing cycle. Hence, the cycle enabling circuit 40 preferably cancels any cycle enable signal received from the user during the brewing cycle. Thus, safety is enhanced by resetting the bistable circuit at the end of a brewing cycle and not before.

The cycle enabling circuit 40 also has a few other features which ensure reliable operation. A diode 48 is used to connect the collector of the transistor 42 to the OFF input of the integrated circuit 20 in order to ensure that the OFF input of alarm clock integrated circuit can never reset the bistable circuit. Of greater importance is a capacitor 50, typically 0.5 microfarads, which limits the response time of the bistable circuit to no greater than 5 milliseconds. The capacitor 50 functions as a memory element to hold the state of the bistable circuit in the event of electrical noise pulses which are received, for example, from the line cord 23.

In view of the above, an economical cycle timer for a household appliance has been disclosed which accepts a manual cycle enable signal and which uses a conventional alarm clock integrated circuit. A cycle enabling circuit ensures that the appliance is not repetitively activated when the appliance is unattended. The cycle enabling circuit includes only a hand full of low cost parts and receives a cycle enable signal from the usual on-automatic-off switch so that the safety feature only slightly increases the cost of the electronic timer.

What is claimed is:

1. An electronic timer for activating a household appliance for a limited duration upon the occurrence of a selected time of day, said timer having an integrated circuit including
   (a) an internal clock registering the time of day and means for setting the registered time to the correct local time,
   (b) an internal register storing a preset activation time and means for setting the activation time to a selected time, and
   (c) means for generating an activation signal for said limited duration upon the coincidence of the time of day registered by the internal clock and the preset activation time when an activation enable signal is present,
   wherein the improvement comprises means for preventing said household appliance from being activated on a daily basis in the absence of manual intervention including, in combination,
   means for receiving from the user a cycle enable signal, and
   cycle enabling means for generating the activation enable signal in response to the cycle enable signal, said cycle enabling means including a bistable circuit determining the logic state of the activation enable signal, wherein said bistable circuit is set upon the occurrence of the cycle enable signal being received from the user to generate an active activation enable signal, and said bistable circuit is automatically reset by said activation signal to generate an inactive activation enable signal thereby preventing said household appliance from being reactivated unless a cycle enable signal is thereafter received from the user.

2. The electronic timer as claimed in claim 1, wherein said cycle enabling means further includes means for resetting said bistable circuit upon the occurrence of the active-to-inactive transition of said activation signal.

3. The electronic timer as claimed in claim 1, wherein said bistable circuit includes means for establishing a predetermined reponse time of at least approximately five milliseconds so that said bistable circuit is not set or reset by said respective cycle enable signal and activation signal unless said signals are present for a time duration of at least said predetermined response time thereby rejecting noise.

4. The electronic timer as claimed in claim 1, wherein said means for receiving from the user a cycle enable signal comprises a multi-position switch having a first position wherein said activation signal is disabled regardless of said means for generating an activation signal, a second position wherein said activation signal is responsive to said cycle enabling means, and a third position wherein said activation signal is active regardless of said means for generating an activation signal, wherein said cycle enable signal is active to set said bistable circuit when said multi-position switch is in a position other than said second position, and cannot set said bistable circuit when said multi-position switch is in said second position.

5. The electronic timer as claimed in claim 1, wherein said integrated circuit is a conventional alarm clock integrated circuit and said cycle enabling means is an electronic circuit external to said integrated circuit.

6. The electronic timer as claimed in claim 5, wherein said bistable circuit includes a pair of complementary transistors, the input of each transistor being responsive to the output of the other transistor thereby establishing a first state wherein the transistors are both active and a second state wherein the transistor are both inactive, and wherein said bistable circuit further comprises a capacitor for maintaining the state of said bistable circuit to establish a predetermined response time for rejecting noise.

7. The electronic timer as claimed in claim 6, wherein the time constant of said capacitor is at least approximately five milliseconds.

8. The electronic timer as claimed in claim 6, wherein said transistors are bipolar transistors, the collector of each transistor is connected to the base of the other transistor through at least one resistor, and said capacitor has a first terminal connected to a terminal of one of said resistors.

9. The electronic timer as claimed in claim 8, wherein said first terminal of said capacitor is connected through a first one of said resistors to the base of one of said transistors and through a second one of said resistors to the collector of the other of said transistors.

10. The electronic timer as claimed in claim 8, wherein said means for receiving from the user a cycle enable signal includes a switch connecting the emitter of a first one of said transistor to a respective power supply voltage, and said cycle enabling means includes a capacitor applying the activation signal to the base of one of said transistors.

11. The electronic timer as claimed in claim 8, wherein said cycle enabling means includes a diode feeding the activation enable signal from the collector of one of said transistors to said integrated circuit, and wherein said electronic timer includes a switch having a first contact connected to said diode and said integrated circuit and a second contact connected to a supply voltage overriding said cycle enabling means.

12. An electronic timer for activating a brewing device in a coffee maker for a limited duration upon the occurrence of a selected time of day, said electronic timer comprising, in combination, an alarm clock integrated circuit clocking the time of day, receiving at enable signal and generating an alarm signal for activating said brewing device for said limited duration when enabled by said enable signal and the time of day is coincident with a preset alarm time, time setting switches for setting the time of day and said alarm time for said integrated circuit, a digital display indicating the time of day clocked by said integrated circuit, a multi-position switch having an "off" position for disabling said brewing device, an "automatic" position, and an "on" position for activating the brewing device regardless of whether the time of day is coincident with the alarm time, and a bistable circuit for generating the enable signal for the integrated circuit and preventing said brewing device from being activated on a daily basis in the absence of manual intervention, said bistable circuit being manually set to generate an active enable signal when the multi-position switch is toggled from the automatic position, and being automatically reset to disable the enable signal in response to activation of the brewing device thereby preventing said brewing device from being reactivated unless a cycle enable signal is thereafter received from the user.

13. The electronic timer as claimed in claim 12, werein the bistable circuit is reset at the end of brewing.

14. The electronic timer as claimed in claim 12, wherein the bistable circuit includes a capacitor for limiting the response time of the bistable circuit thereby providing noise immunity.

15. The electronic timer as claimed in claim 14, wherein the response time of the bistable circuit is at least 5 milliseconds.

16. The electronic timer as claimed in claim 14, wherein the bistable circuit includes an interconnected pair of complementary bipolar transistors.

17. The electronic timer as claimed in claim 16, wherein toggling of the multi-position switch sets the bistable circuit by interrupting the flow of current through at least one of said transistors.

18. The electronic timer as claimed in claim 16, wherein the bistable circuit is reset by an electrical pulse coupled through a capacitor to a base of one of said transistors.

19. An electronic cycle timer for activating a coffee maker for a limited duration upon the occurrence of a selected time of day, said timer having an integrated circuit including
(a) an internal clock registering the time of day and means for setting the registered time to the correct local time,
(b) an internal register storing a preset activation time and means for setting the activation time to a selected time,
(c) means for generating a brew signal to activate said coffee maker for said limited duration upon the coincidence of the time of day registered by the internal clock and the preset activation time when a brew enable signal is present,
wherein the improvement comprises means for preventing said coffee maker from being activated on a daily basis in the absence of manual intervention including, in combination, a switch for receiving from the user a cycle enable signal, and a bistable circuit for generating the brew enable signal in response to the cycle enable signal, said bistable circuit being set to one state activating the brew enable signal upon the occurrence of the cycle enable signal, and being automatically reset to the other state by said brew signal to disable the brew enable signal thereby preventing said coffee maker from being reactivated unless a cycle enable signal is thereafter received from the user.

20. The electronic timer as claimed in claim 19, wherein said bistable circuit includes an interconnected pair of complementary transistors and a capacitor for limiting the response time of said bistable circuit to thereby reject electrical noise pulses.

* * * * *